(12) United States Patent
Wentink et al.

(10) Patent No.: US 9,973,314 B2
(45) Date of Patent: May 15, 2018

(54) CONTROL FRAME AGGREGATION FRAME

(71) Applicant: QUALCOMM Incorporated, San Diego, CA (US)

(72) Inventors: Maarten Menzo Wentink, Naarden (NL); Simone Merlin, Solana Beach, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 15/090,431

(22) Filed: Apr. 4, 2016

(65) Prior Publication Data

US 2016/0294515 A1    Oct. 6, 2016

Related U.S. Application Data

(60) Provisional application No. 62/143,381, filed on Apr. 6, 2015.

(51) Int. Cl.
*H04L 5/00* (2006.01)
*H04L 1/00* (2006.01)
*H04L 1/16* (2006.01)

(52) U.S. Cl.
CPC ............ *H04L 5/005* (2013.01); *H04L 1/0079* (2013.01); *H04L 1/1671* (2013.01)

(58) Field of Classification Search
CPC . H04L 1/00; H04L 1/0079; H04L 1/16; H04L 1/1607; H04L 1/1671; H04L 5/00; H04L 5/005
See application file for complete search history.

(56) References Cited

U.S. PATENT DOCUMENTS

| 9,337,954 | B2 * | 5/2016 | Abraham | H04L 1/0027 |
| 9,407,734 | B2 * | 8/2016 | Ashokan | H04L 69/22 |
| 9,674,890 | B2 * | 6/2017 | Song | H04W 84/12 |
| 2003/0169769 | A1 * | 9/2003 | Ho | H04L 1/1621 370/473 |
| 2005/0152358 | A1 * | 7/2005 | Giesberts | H04L 29/06 370/389 |

(Continued)

FOREIGN PATENT DOCUMENTS

WO    WO-2012074316 A2    6/2012

OTHER PUBLICATIONS

International Search Report and Written Opinion—PCT/US2016/026014—ISA/EPO—dated Jul. 18, 2016.

*Primary Examiner* — Tri H Phan
(74) *Attorney, Agent, or Firm* — Paradice and Li LLP

(57) ABSTRACT

Systems and methods are disclosed that may communicate a control aggregate frame from a first wireless device to a second wireless device. A first wireless device may form a control aggregate frame by aggregating a plurality of first control frames into the control aggregate frame. The control aggregate frame may include a single media access control (MAC) header, a plurality of first aggregation fields, each storing a control frame subtype for a corresponding one of the plurality of first control frames, and a plurality of first payload fields, each storing a corresponding one of the plurality of first control frames. After generating the control aggregate frame, the first wireless device may transmit it to the second wireless device.

40 Claims, 17 Drawing Sheets

(56) References Cited

U.S. PATENT DOCUMENTS

| | | | |
|---|---|---|---|
| 2005/0165950 A1* | 7/2005 | Takagi | H04L 12/413 709/236 |
| 2006/0285517 A1 | 12/2006 | Kakani | |
| 2008/0130538 A1* | 6/2008 | Raissinia | H04L 1/1685 370/310 |
| 2008/0130561 A1 | 6/2008 | Shao et al. | |
| 2010/0014463 A1* | 1/2010 | Nagai | H04B 7/0695 370/328 |
| 2010/0016023 A1* | 1/2010 | Yamauchi | H04L 5/0037 455/562.1 |
| 2013/0202025 A1* | 8/2013 | Baron | H04N 19/00139 375/240.02 |
| 2014/0036775 A1* | 2/2014 | Asterjadhi | H04W 28/065 370/328 |
| 2015/0222562 A1* | 8/2015 | Ashokan | H04L 47/27 370/412 |
| 2015/0382342 A1* | 12/2015 | Seok | H04W 74/0816 370/336 |
| 2016/0088641 A1* | 3/2016 | Kwon | H04W 72/085 370/329 |
| 2016/0119811 A1* | 4/2016 | Merlin | H04L 1/00 370/329 |
| 2016/0255606 A1* | 9/2016 | Chu | H04W 72/005 370/312 |
| 2016/0302229 A1* | 10/2016 | Hedayat | H04B 7/0452 |

* cited by examiner

| Type | Type Description | Subtype Value | Subtype Description |
|---|---|---|---|
| 1 | Control | 0000-0011 | Reserved |
| 1 | Control | 0100 | Beamforming Report Poll |
| 1 | Control | 0101 | VHT NDP Announcement |
| 1 | Control | 0110 | Control Frame Extension |
| 1 | Control | 0111 | Control Wrapper |
| 1 | Control | 1000 | Block Ack Request |
| 1 | Control | 1001 | Block Ack |
| 1 | Control | 1010 | PS-Poll |
| 1 | Control | 1011 | RTS |
| 1 | Control | 1100 | CTS |
| 1 | Control | 1101 | Ack |
| 1 | Control | 1110 | CF-End |
| 1 | Control | 1111 | CF-End + CF-Ack |

FIG. 4

| Control frame | Can be aggregated? | Length field |
|---|---|---|
| Other | yes | Extended length (12 bits) |
| Control Aggregate | no | |
| BR-Poll | yes | Reserved (0) |
| VHT NDPA | yes | Number of STA Info fields |
| Control Frame Extension | yes | Reserved (0) |
| Control Wrapper | no | |
| BAR | yes | Reserved (0) |
| BA | yes | Length Present = 0: Reserved (0) / Length Present = 1: Extended length (11 bits) |
| PS-Poll | yes | AID |
| RTS | yes | Reserved (0) |
| CTS | yes | Reserved (0) |
| Ack | yes | Reserved (0) |
| CF-End | yes | Reserved (0) |
| CF-End+CF-Ack | yes | Reserved (0) |

FIG. 7

| Multi-TID subfield value | Compressed Bitmap subfield value | GCR subfield value | BlockAck frame variant |
|---|---|---|---|
| 0 | 0 | 0 | Basic BlockAck |
| 0 | 1 | 0 | Compressed BlockAck |
| 1 | 0 | 0 | Extended Compressed BlockAck |
| 1 | 1 | 0 | Multi-TID BlockAck |
| 0 | 0 | 1 | Reserved |
| 0 | 1 | 1 | GCR BlockAck |
| 1 | 0 | 1 | Reserved |
| 1 | 1 | 1 | Reserved |

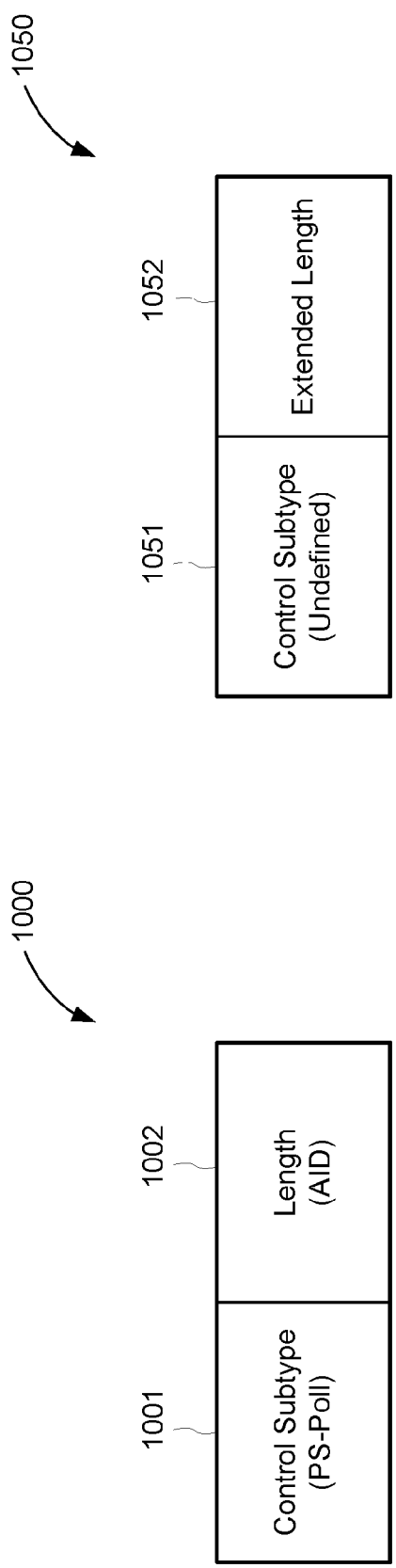

| Control frame | Can be aggregated? | Length Info field |
|---|---|---|
| Other | yes | Reserved |
| Control Aggregate | no | Reserved (0) |
| BR-Poll | yes | Reserved (0) |
| VHT NDPA | yes | Number of STA Info fields |
| Control Frame Extension | yes | Reserved (0) |
| Control Wrapper | no | |
| BAR | yes | Reserved (0) |
| BA | yes | Reserved (0) |
| PS-Poll | yes | AID |
| RTS | yes | Reserved (0) |
| CTS | yes | Reserved (0) |
| Ack | yes | Reserved (0) |
| CF-End | yes | Reserved (0) |
| CF-End+CF-Ack | yes | Reserved (0) |

FIG. 13

CONTROL FRAME AGGREGATION FRAME

CROSS-REFERENCE TO RELATED APPLICATION

This application claims priority to and commonly owned U.S. Provisional Patent Application No. 62/143,381 entitled "CONTROL FRAME AGGREGATION FRAME" filed on Apr. 6, 2015, the entirety of which is incorporated by reference herein.

TECHNICAL FIELD

The example embodiments relate generally to wireless networks, and specifically to aggregating a plurality of control frames into a single aggregated frame for transmission.

BACKGROUND OF RELATED ART

A wireless local area network (WLAN) may be formed by one or more access points (APs) that provide a shared wireless communication medium for use by a number of client devices or stations (STAs). The STAs and AP(s) may exchange data and other information by transmitting frames to each other. These frames may include, for example, data frames, management frames, action frames, and control frames. To improve efficiency of the wireless medium, the IEEE 802.11 standards allow a plurality of frames to be aggregated together and then transmitted as a single aggregated frame. For example, a wireless device may aggregate a plurality of data frames into an aggregated data frame, and then transmit the aggregated data frame to another wireless device. Although control frames may be aggregated together using the format defined for aggregating data frames, aggregating control frames in this manner may be inefficient. Thus, it would be desirable to aggregate a plurality of control frames in a manner that achieves a more efficient use of the shared wireless medium.

SUMMARY

This Summary is provided to introduce in a simplified form a selection of concepts that are further described below in the Detailed Description. This Summary is not intended to identify key features, or essential features of the claimed subject matter, nor is it intended to limit the scope of the claimed subject matter.

Apparatus and methods are disclosed that may allow for communication of a control aggregate frame from a first wireless device to a second wireless device. In one aspect, a method of communicating a control aggregate frame is disclosed. The method may be performed by the first wireless device, and may include forming the control aggregate frame by aggregating a plurality of first control frames into the control aggregate frame, where the control aggregate frame includes a single media access control (MAC) header, a plurality of first aggregate fields, each storing a control frame subtype for a corresponding one of the plurality of first control frames, and a plurality of first payload fields, each storing a corresponding one of the plurality of first control frames. After the control aggregate frame is formed, it may be transmitted to the second wireless device.

In another aspect, a wireless device is disclosed. The wireless device may include one or more processors and a memory. The memory may store one or more programs including instructions that, when executed by the one or more processors, cause the wireless device to form the control aggregate frame by aggregating a plurality of first control frames into the control aggregate frame, where the control aggregate frame includes a single MAC header, a plurality of first aggregate fields, each storing a control frame subtype for a corresponding one of the plurality of first control frames, and a plurality of first payload fields, each storing a corresponding one of the plurality of first control frames. After the control aggregate frame is formed, it may be transmitted to another wireless device.

In another aspect, a first wireless device for communicating a control aggregate frame to a second wireless device is disclosed. The first wireless device may include means for forming the control aggregate frame by aggregating a plurality of first control frames into the control aggregate frame, and means for transmitting the control aggregate frame to the second wireless device. The control aggregate frame may include a single MAC header, a plurality of first aggregate fields, each storing a control frame subtype for a corresponding one of the plurality of first control frames, and a plurality of first payload fields, each storing a corresponding one of the plurality of first control frames. The first wireless device may also include means for transmitting the control aggregate frame to the second wireless device.

In other aspect, a non-transitory computer-readable storage medium is disclosed. The non-transitory computer-readable storage medium may store one or more programs containing instructions that, when executed by one or more processors of a first wireless device, cause the first wireless device to perform a number of operations. The number of operations may include forming the control aggregate frame by aggregating a plurality of first control frames into the control aggregate frame, where the control aggregate frame includes a single MAC header, a plurality of first aggregate fields, each storing a control frame subtype for a corresponding one of the plurality of first control frames, and a plurality of first payload fields, each storing a corresponding one of the plurality of first control frames. After the control aggregate frame is formed, it may be transmitted to another wireless device.

BRIEF DESCRIPTION OF THE DRAWINGS

The example embodiments are illustrated by way of example and are not intended to be limited by the figures of the accompanying drawings.

FIG. 4 shows a table depicting type and subtype values for control frames defined by the IEEE 802.11 standards.

FIG. 7 shows an example table listing some attributes of control frames, in accordance with example embodiments.

FIG. 10A shows an example aggregate field for a power-save poll (PS-Poll) frame, in accordance with example embodiments.

FIG. 10B shows an example aggregate field for an undefined control frame, in accordance with example embodiments.

FIG. 13 shows another example table listing some attributes of control frames, in accordance with example embodiments.

Like reference numerals refer to corresponding parts throughout the drawing figures.

DETAILED DESCRIPTION

Figure 1:
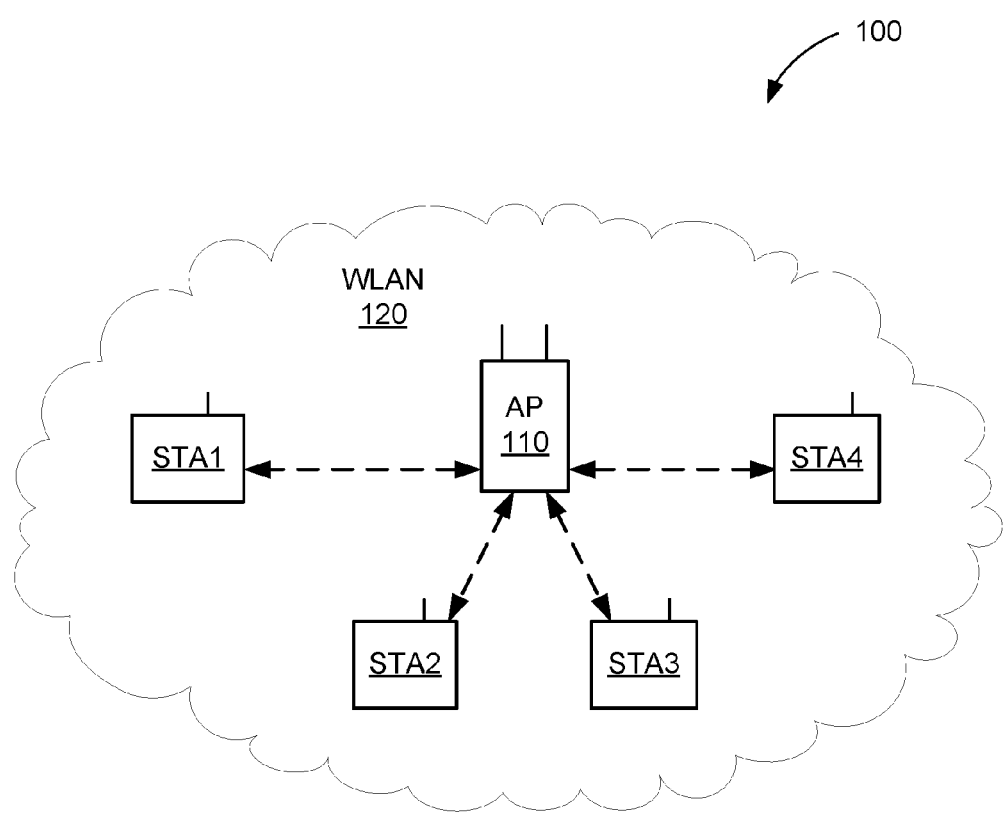
FIG. 1 shows a block diagram of a wireless system within which the example embodiments may be implemented.

The example embodiments are described below in the context of WLAN systems for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots.

In addition, although described herein in terms of exchanging data frames between wireless devices, the example embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs. Further, as used herein, the term "aggregate control frame" refers to control frames that may be aggregated together in accordance with example embodiments, and the term "control aggregate frame" refers to a control frame that, in accordance with example embodiments, includes a number of aggregate control frames.

In the following description, numerous specific details are set forth such as examples of specific components, circuits, and processes to provide a thorough understanding of the present disclosure. The term "coupled" as used herein means connected directly to or connected through one or more intervening components or circuits.

Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The example embodiments are not to be construed as limited to specific examples described herein but rather to include within their scopes all embodiments defined by the appended claims.

As mentioned above, the IEEE 802.11 standards define a number of types of frames including, for example, data frames, management frames, and control frames. Control frames are typically used to assist in the delivery of data frames, for example, by administering access to the shared wireless medium of a WLAN. Control frames may include (but are not limited to) a trigger frame, a request-to-send (RTS) frame, a clear-to-send (CTS) frame, a power-save poll (PS-Poll) frame, an acknowledgment (ACK) frame, a block acknowledgment (BA) frame, a block acknowledgment request (BAR) frame, a multi-station block acknowledgment (MBA) frame, a contention free period end (CF-End) frame, a CF-End+CF-ACK frame, a null data packet announcement (NDPA) frame, and a beamforming report poll (BRPOL) frame. Different types of control frames may be aggregated together to form a single aggregated control frame. For one example, it may be desirable for a wireless device to aggregate a BAR frame and a VHT NDPA frame together for transmission as a single frame. For another example, it may be desirable for a wireless device to aggregate a trigger frame and an MBA frame together for transmission as a single frame.

In a typical WLAN, control frames are aggregated together into an A-MPDU, which may be encapsulated into a PPDU and then transmitted over a wireless medium as a single packet. The A-MPDU format, as defined in the IEEE 802.11 standards, requires (i) each aggregated control frame to be preceded by a 4-byte MPDU delimiter, (ii) each aggregated control frame to have its own frame check sequence (FCS) field, and (iii) that a physical layer (PHY) mode is used that supports the A-MPDU format. Although suitable for aggregating a plurality of data frames together, the A-MPDU format may not be well suited for aggregating a plurality of control frames together. More specifically, because control frames are typically much smaller than data frames, the overhead associated with A-MPDUs (e.g., separate delimiters and FCS fields for each aggregated frame) carrying aggregated control frames constitutes a much greater portion of the overall packet size than the overhead associated with A-MPDUs carrying aggregated data frames.

Further, in many WLANs, information is transmitted using orthogonal frequency-division multiplexing (OFDM) symbols. However, because the preamble of an OFDM packet does not support signaling to indicate the presence of an A-MPDU in the PPDU, frame aggregation may not be possible using an OFDM PHY, thereby limiting the ability of wireless devices to use OFDM PHYs to aggregate control frames.

In addition, aggregation of control frames is not currently possible using either direct-sequence spread spectrum (DSSS) or complementary code keying (CCK) modulation techniques, for example, because the A-MPDU format is not yet defined for DSSS or CCK modulation techniques. Since data transmissions using DSSS and CCK modulation techniques may have greater range than data transmissions using other modulation techniques, it would be desirable to transmit an aggregated control frame using DSSS and/or CCK modulation techniques.

Accordingly, when a wireless device has a number of control frames that may be aggregated together for transmission, it would be desirable to aggregate the control frames together in a manner that minimizes overhead, allows the aggregated control frames to be transmitted using OFDM PHYs, and allows the aggregated control frames to be transmitted using DSSS and/or CCK modulation techniques. These are at least some of the technical problems to be solved by the example embodiments.

In accordance with example embodiments, methods and apparatuses are disclosed that may allow a wireless device to aggregate a plurality of control frames together in a control aggregate frame that is specifically formatted for the aggregation of control frames. More specifically, for at least some implementations, a control aggregate subtype may be defined that may allow control aggregate frames disclosed herein to have less overhead than the A-MPDU frame format typically used for aggregating control frames, that may allow wireless devices to transmit the control aggregate frames using OFDM PHYs, and that may allow wireless devices to transmit the control aggregate frames using DSSS and/or CCK modulation techniques. These and other details of the example embodiments, which provide one or more technical solutions to the aforementioned technical problems, are described in more detail below.

FIG. 1 is a block diagram of a wireless system 100 within which the example embodiments may be implemented. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 may be assigned a unique media access control (MAC) address that is programmed therein by, for example, the manufacturer of the access point. Similarly, each of stations STA1-STA4 may also be assigned a unique MAC address. For some embodiments, the wireless system 100 may correspond to a multiple-input multiple-output (MIMO) wireless network, and may support single-user MIMO (SU-MIMO) and multi-user MIMO (MU-MIMO) communications. Further, although the WLAN 120 is depicted in FIG. 1 as an infrastructure basic service set (BSS), for other example embodiments, WLAN 120 may be an IBSS, an ad-hoc network, or a peer-to-peer (P2P) network (e.g., operating according to the Wi-Fi Direct protocols).

Each of stations STA1-STA4 may be any suitable Wi-Fi enabled wireless device including, for example, a cell phone, personal digital assistant (PDA), tablet device, laptop computer, or the like. Each of stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each of stations STA1-STA4 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 20.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 20.

For the stations STA1-STA4 and/or AP 110, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band, within a 5 GHz frequency band in accordance with the IEEE 802.11 specification, and/or within a 60 GHz frequency band. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within each of the stations STA1-STA4 may be any technically feasible transceiver such as a ZigBee transceiver described by a specification from the ZigBee specification, a WiGig transceiver, and/or a HomePlug transceiver described a specification from the HomePlug Alliance.

Figure 2:
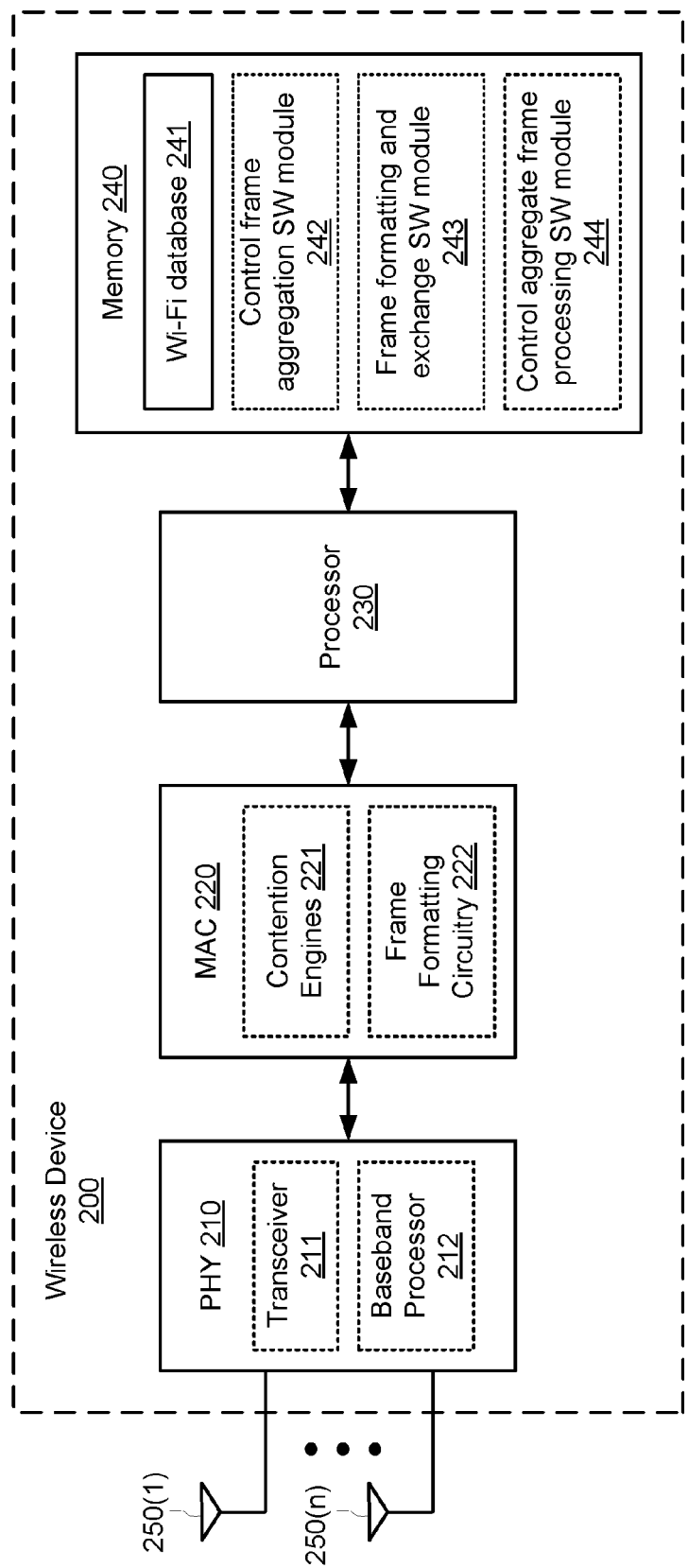
FIG. 2 shows a block diagram of a wireless device in accordance with example embodiments.

FIG. 2 shows an example wireless device 200 that may be one embodiment of one or more of the stations STA1-STA4 and/or AP 110 of FIG. 1. The wireless device 200 may include a PHY device 210, may include a MAC 220, may include a processor 230, may include a memory 240, and may include a number of antennas 250(1)-250(n).

The PHY device 210 may include at least a number of transceivers 211 and a baseband processor 212. The transceivers 211 may be coupled to antennas 250(1)-250(n), either directly or through an antenna selection circuit (not shown for simplicity). The transceivers 211 may be used to transmit signals to and receive signals from other wireless devices, and may be used to scan the surrounding environment to detect and identify other wireless devices (e.g., within wireless range of wireless device 200). Although not shown in FIG. 2 for simplicity, the transceivers 211 may include any number of transmit chains to process and transmit signals to other wireless devices via antennas 250(1)-250(n), and may include any number of receive chains to process signals received from antennas 250(1)-250(n). Thus, for example embodiments, the wireless device 200 may be configured for MIMO operations. The MIMO operations may include SU-MIMO operations and MU-MIMO operations.

The baseband processor 212 may be used to process signals received from processor 230 and/or memory 240 and to forward the processed signals to transceivers 211 for transmission via one or more of antennas 250(1)-250(n), and may be used to process signals received from one or more of antennas 250(1)-250(n) via transceivers 211 and to forward the processed signals to processor 230 and/or memory 240.

Processor 230 may be any suitable one or more processors capable of executing scripts or instructions of one or more software programs stored in wireless device 200 (e.g., within memory 240). For purposes of discussion herein, MAC 220 is shown in FIG. 2 as being coupled between PHY device 210 and processor 230. For actual embodiments, PHY device 210, MAC 220, processor 230, and/or memory 240 may be connected together using one or more buses (not shown for simplicity).

The MAC 220 may include at least a number of contention engines 221 and frame formatting circuitry 222. The contention engines 221 may contend for access to one more shared wireless mediums, and may also store packets for transmission over the one more shared wireless mediums. The wireless device 200 may include one or more contention engines 221 for each of a plurality of different access categories. For other embodiments, the contention engines 221 may be separate from MAC 220. For still other embodiments, the contention engines 221 may be implemented as one or more software modules (e.g., stored in memory 240 or stored in memory provided within MAC 220) containing instructions that, when executed by processor 230, perform the functions of contention engines 221.

The frame formatting circuitry 222 may be used to create and/or format frames received from processor 230 and/or memory 240 (e.g., by adding MAC headers to PDUs provided by processor 230), and may be used to re-format frames received from PHY device 210 (e.g., by stripping MAC headers from frames received from PHY device 210).

Memory 240 may include a Wi-Fi database 241 that may store profile information for a plurality of APs and/or STAs. The profile information for a particular AP may include, for example, the AP's service set identification (SSID), MAC address, channel information, received signal strength indicator (RSSI) values, goodput values, channel state information (CSI), supported data rates, capabilities, connection history, a trustworthiness value of the AP (e.g., indicating a level of confidence about the AP's location, etc.), and any other suitable information pertaining to or describing the operation of the AP. The profile information for a particular STA may include, for example, its MAC address, capabilities, supported data rates, connection history, and any other suitable information pertaining to or describing the operation of the STA.

Figure 20:
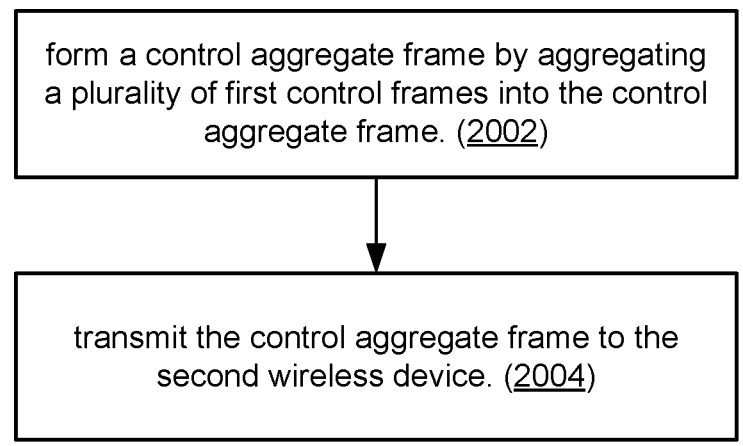
FIG. 20 shows an illustrative flow chart depicting an example operation for aggregating a number of control frames together to form an aggregate control frame for transmission, in accordance with example embodiments.

Memory 240 may also include a non-transitory computer-readable medium (e.g., one or more nonvolatile memory elements, such as EPROM, EEPROM, Flash memory, a hard drive, and so on) that may store at least the following software (SW) modules:

a control frame aggregation software module 242 for facilitating the aggregation of a plurality of control frames into a single control aggregate frame for transmission to one or more other wireless devices (e.g., as described for one or more operations of FIG. 20);

a frame formatting and exchange software module 243 for facilitating the creation and exchange of frames (e.g., data frames, management frames, control frames, action frames, and control aggregate frames) between wireless device 200 and other wireless devices (e.g., as described for one or more operations of FIG. 20); and a control aggregate frame processing software module 244 for facilitating the processing and extraction of control frames encapsulated in received control aggregate frames (e.g., as described for one or more operations of FIG. 20).

Each software module includes instructions that, when executed by processor 230, cause the wireless device 200 to perform the corresponding functions. The non-transitory computer-readable medium of memory 240 thus includes instructions for performing all or a portion of the operations described below with respect to FIG. 20.

For example, processor 230 may execute the control frame aggregation software module 242 to facilitate the aggregation of a plurality of control frames into a single control aggregate frame for transmission to one or more other wireless devices. Processor 230 may execute the frame formatting and exchange software module 243 to facilitate the creation and exchange of any suitable frames between wireless device 200 and other wireless devices. Processor 230 may execute the control aggregate frame processing software module 244 to facilitate the processing and extraction of control frames encapsulated in received control aggregate frames.

Figure 3:
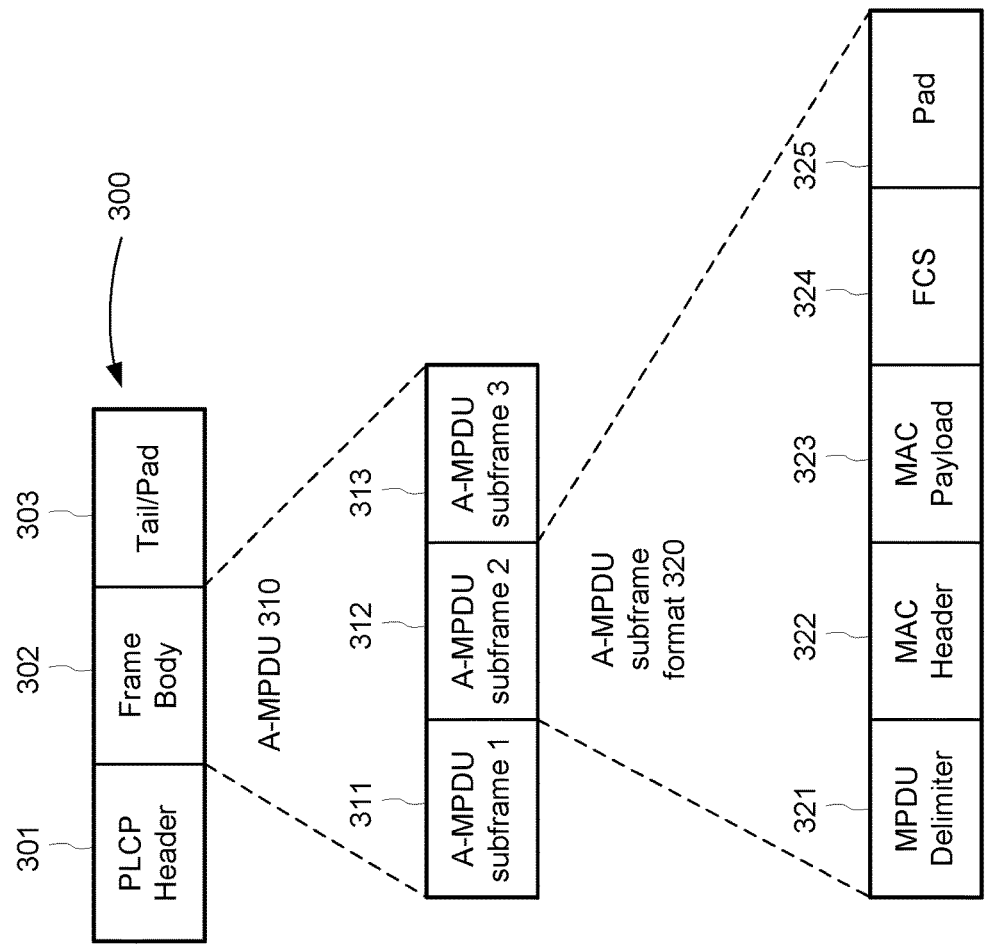
FIG. 3 shows a physical layer convergence procedure protocol data unit (PPDU) as defined by the IEEE 802.11 standards.

FIG. 3 shows a PPDU 300 as defined by the IEEE 802.11 standards. The PPDU 300 is shown to include a physical layer convergence protocol (PLOP) header 301, a frame body 302 carrying an A-MPDU 310, and a Tail/Pad 303. The A-MPDU 310 is shown to include a plurality of A-MPDU subframes 311-313. Although only three A-MPDU subframes 311-313 are shown in the example of FIG. 3, it is to be understood that the A-MPDU 310 may include other suitable numbers of A-MPDU subframes. Each of the A-MPDU subframes 311-313 may encapsulate a single frame (e.g., a single data frame or a single control frame).

More specifically, each of the A-MPDU subframes 311-313 has an A-MPDU subframe format 320 that includes an MPDU delimiter 321, a MAC header 322, a MAC payload 323, a frame check sequence (FCS) field 324, and a pad 325. The MPDU delimiter 321 may be used to indicate the start of the corresponding subframe. The MAC header 322 contains a number of well-known fields including, for example, a frame control field, a duration field, and one or more address fields. Although not shown for simplicity, the frame control field for each A-MPDU subframe typically includes a 2-bit type field and a 4-bit subtype field. The 2-bit type field indicates whether the corresponding frame is a data frame, a management frame, or a control frame. The 4-bit subtype field specifically identifies the corresponding frame (e.g., which type of control frame). The MAC payload 323 contains the encapsulated frame (e.g., a control frame or data frame). The FCS field 324 contains a frame check sequence that may be used for error detection. Thus, as depicted in FIG. 3, using the A-MPDU 310 for aggregating control frames may result in significant overhead (e.g., as compared to the size of the control frames themselves). More specifically, because using the format depicted in FIG. 3 requires each aggregated control frame to be stored in a corresponding one of the A-MPDU subframes 311-313, each of the aggregated control frames encapsulated within the PPDU 300 will have its own MPDU delimiter 321, its own MAC header 322, and its own FCS field 324. Thus, it would be desirable to reduce the overhead associated with transmitting a packet containing a plurality of aggregated control frames.

FIG. 4 shows a table 400 depicting type and subtype values for control frames defined by the IEEE 802.11 standards. As mentioned above, the 2-bit type field indicates whether the corresponding frame is a data frame, a management frame, or a control frame. All control frames have a type value of "01" (or simply "1" as depicted in FIG. 4). The 4-bit subtype field specifically identifies the corresponding frame. For one example, if the control frame is an ACK frame, then the subtype field is set to "1101." For another example, if the control frame is an RTS frame, then the subtype field is set to "1011." Subtype values between 0000-0011 are reserved.

Figure 5:
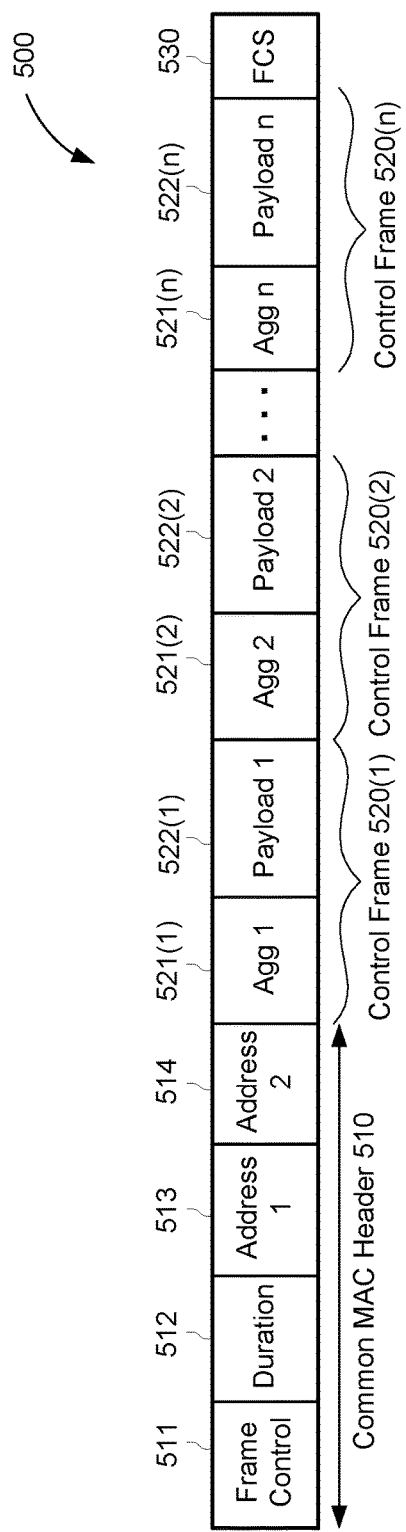
FIG. 5 shows an example control aggregate frame, in accordance with example embodiments.

FIG. 5 shows an example control aggregate frame 500, in accordance with example embodiments. As described below, using the control aggregate frame 500 for aggregating a plurality of control frames may reduce the transmission overhead, for example, compared to the overhead of the A-MPDU 310 described above with respect to FIG. 3. As depicted in FIG. 5, the control aggregate frame 500 includes a common (e.g., a single) MAC header 510, a plurality of control frames 520(1)-520(n), and an FCS field 530. The MAC header 510 is shown to include a frame control field 511, a duration field 512, an address 1 field 513, and an address 2 field 514. In some aspects, the address 1 field 513 may store a receiver address (RA), and the address 2 field 514 may store a transmitter address (TA).

Specifically, the MAC header 510 is common to (e.g., shared by) the control frames 520(1)-520(n) that may be aggregated into the control aggregate frame 500. Each of the control frames 520(1)-520(n) may be stored in a corresponding pair of an aggregation (Agg) field 521 and a payload field 522. In some aspects, each of aggregation fields 521(1)-521(n) may specify the frame subtype of a corresponding one of the control frames 520(1)-520(n), and each of payload fields 522(1)-522(n) may store the payload of the corresponding one of the control frames 520(1)-520(n). In some aspects, each aggregation fields 521(1)-521(n) also may specify the length of the corresponding one of the control frames 520(1)-520(n).

For example, aggregation field 521(1) may be used to store the frame subtype and length of the first control frame 520(1), and payload field 522(1) may be used to store the payload data of the first control frame 520(1). In a similar manner, aggregation field 521(2) may be used to store the frame subtype and length of the second control frame 520(2), and payload field 522(2) may be used to store the payload data of the second control frame 520(2). The control aggregate frame 500 may include any suitable number of pairs of aggregation fields 521 and payload fields 522.

It is noted that some control frames may not have any payload data. Thus, in accordance with example embodiments, a control frame that does not carry any payload data may be stored entirely within a corresponding aggregation field 521, thereby allowing for the omission of a corresponding payload field 522. For example, CTS frames and ACK frames do not carry any payload data. Thus, a CTS frame may be stored entirely within a corresponding aggregation field 521 of the control aggregate frame 500 without the need for a corresponding payload field 522. Similarly, an ACK frame may be stored entirely within a corresponding aggregation field 521 of the control aggregate frame 500 without the need for a corresponding payload field 522. In this manner, the size of control aggregate frame 500 may be minimized when carrying control frames that don't have any payload data, for example, by not including a separate payload field 522.

Because the control frames 520(1)-520(n) contained in the control aggregate frame 500 share a single MAC header 510 and do not need their own A-MPDU delimiters, the control aggregate frame 500 has less overhead than the A-MPDU 310 described above with respect to FIG. 3. Accordingly, using the control aggregate frame 500 to transmit a plurality of aggregated control frames over a wireless medium may be more efficient (e.g., use less transmission time) than using the A-MPDU 310 to transmit a plurality of aggregated control frames over the wireless medium.

Figure 6:
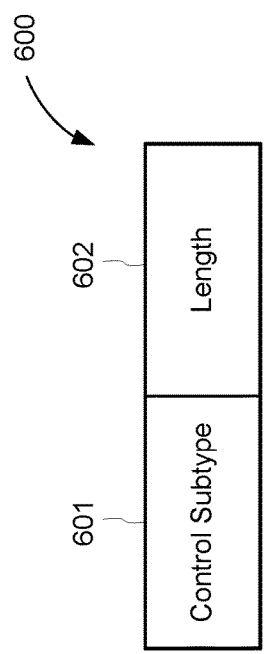
FIG. 6 shows an example aggregate field, in accordance with the example embodiments.

FIG. 6 depicts an example aggregation field 600, in accordance with example embodiments. The aggregation field 600, which may be one embodiment of one or more of the aggregation fields 521(1)-521(n) of the control aggregate frame 500 of FIG. 5, may include a 4-bit control subtype field 601 and a 4-bit length field 602. The subtype field 601 may indicate the frame subtype of a corresponding control frame 520 contained in the control aggregate frame 500 of FIG. 5. In some aspects, the frame subtype values depicted in FIG. 4 may be used for the subtype field 601 of FIG. 6. The length field 602 may indicate a length of the corresponding control frame 520 contained in the control aggregate frame 500 of FIG. 5. In some aspects, the value stored in the length field 602 may be based on the type of the corresponding control frame 520. For example, FIG. 7 shows a table 700 indicating whether each of a number of different control frames may be aggregated together in accordance with example embodiments (e.g., aggregated together within the control aggregate frame 500 of FIG. 5), and if so, the corresponding value to be stored in the length field 602 of FIG. 6.

Figure 8:
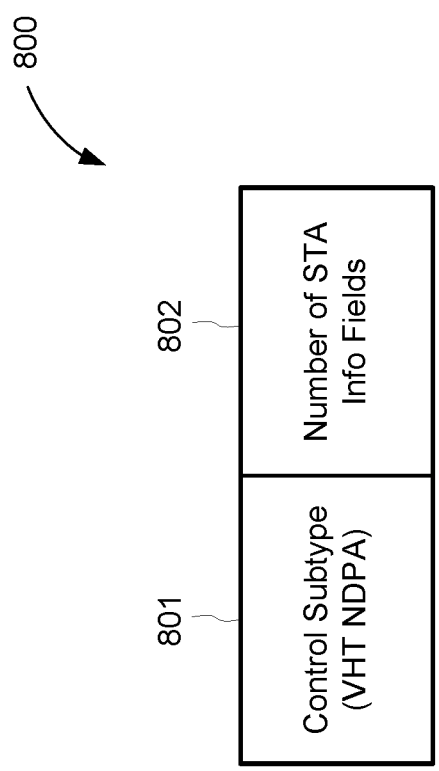
FIG. 8 shows an example aggregate field for a very high throughput (VHT) null data packet announcement (NDPA) frame, in accordance with example embodiments.

FIG. 8 shows an example aggregation field 800 for a very high throughput (VHT) null data packet announcement (NDPA) frame. The aggregation field 800 includes a control subtype field 801 and a length field 802. The control subtype field 801 may be one embodiment of control subtype field 601 of FIG. 6, and the length field 802 may be one embodiment of the length field 602 of FIG. 6. The control subtype field 801 may store a value of "0101" to indicate that the corresponding control frame is a VHT NDPA frame (see also FIG. 4). As depicted in table 700, a VHT NDPA frame may be aggregated into the control aggregate frame 500 of FIG. 5, and the length field 802 corresponding to the VHT NDPA frame may include a number of STA information fields.

Figures 9A, 9B, 9C:
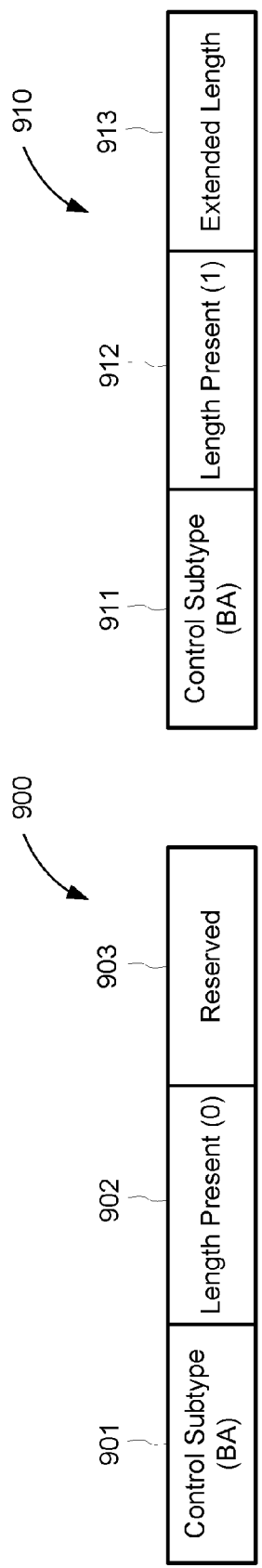
FIGS. 9A and 9B show example aggregate fields for Block Acknowledgement (BA) frames, in accordance with example embodiments.
FIG. 9C shows an example table listing some attributes of BA frame variants which may be used with the example embodiments.

FIG. 9A depicts an example aggregation field 900 for BA frames in accordance with example embodiments, and FIG. 9B depicts another example aggregation field 910 for BA frames in accordance with example embodiments. FIG. 9C shows an example table 920 listing some attributes of BA frame variants which may be used with the example embodiments. Referring also to the table 700 of FIG. 7, to aggregate a BA frame into control aggregate frame 500, the value stored in the length field of a corresponding aggregation field may depend on whether the BA frame is one of the variants currently defined by the IEEE 802.11 standards. In some aspects, the length value may be set to "0" when the BA frame is a currently defined BA frame variant (e.g., those listed in table 920, except the reserved variants), and may be set to "1" when the BA frame is not currently defined (e.g., when the BA frame is a new or undefined variant).

In some implementations, the aggregation field 900 of FIG. 9A may be used for currently defined BA frame variants, and the aggregation field 910 of FIG. 9B may be used for new and/or undefined BA frame variants. For example, the aggregation field 900 of FIG. 9A may include a control subtype field 901 that stores a value of "1001" (e.g., to indicate that the corresponding control frame is a BA frame), may include a length present field 902 storing a value of "0" (e.g., to indicate that the BA frame is a currently defined BA frame variant), and may include a number of reserved bits 903.

The aggregation field 910 of FIG. 9B may include a control subtype field 911 that stores a value of "1001" (e.g., to indicate that the corresponding control frame is a BA frame), may include a length present field 912 storing a value of "1" (e.g., to indicate that the BA frame is not a currently defined BA frame variant), and may include an extended length field 913 that specifies the length of the BA payload. In some aspects, the extended length field 913 may have a length of 11 bits to store the last 3 bits of the length field plus one octet. In other aspects, the extended length field 913 may be of other suitable lengths. Further, for at least some implementations, the maximum payload size may be 2047 octets.

FIG. 10A shows an example aggregation field 1000 for a power-save poll (PS-Poll) frame, in accordance with example embodiments. The aggregation field 1000 is shown to include a subtype field 1001 and a length field 1002. The subtype field 1001 may store a value of "1010" to indicate that the corresponding frame is a PS-Poll frame. In some aspects, the length field 1002 may store a 12-bit AID value for the corresponding PS-Poll frame. Thus, while AID information is typically stored in a duration/id field of a PS-Poll frame, for the example embodiments, the AID information is stored in the length field 1002 of aggregation field 1000.

FIG. 10B shows an example aggregation field 1050 for an undefined control frame, in accordance with example embodiments. The aggregation field 1050 is shown to include a subtype field 1051 and an extended length field 1052. The subtype field 1051 may store a value of "1010" to indicate that the corresponding frame is a PS-Poll frame, and the extended length field 1052 may be used to define new control frames that may be aggregated together within the control aggregate frame 500 of FIG. 5. In some aspects, the extended length field 1052 for a new control frame may be omitted from aggregation field 1050, for example, if a receiving device supports the new control frame.

Figure 11:
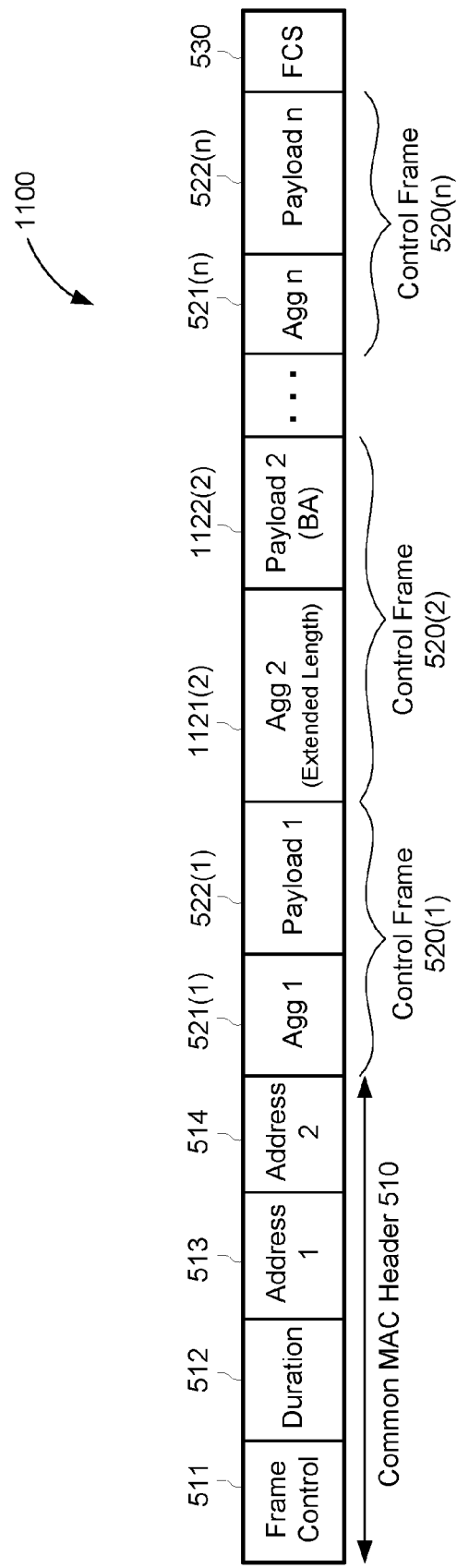
FIG. 11 shows another example control aggregate frame, in accordance with example embodiments.

FIG. 11 depicts another example control aggregate frame 1100, in accordance with example embodiments. The control aggregate frame 1100, which is similar to the control aggregate frame 500 of FIG. 5, is formatted to include an aggregated BA frame. More specifically, the second control frame 520(2) to be aggregated within the control aggregate frame 1100 is a BA frame, and the control aggregate frame 1100 may include an extended length aggregation field 1121(2) and a BA payload 1122(2). The extended length aggregation field 1121(2) may be one embodiment of the extended length field 913 depicted in FIG. 9B, for example, and may have a length of 2 octets (e.g., rather than a 1 octet length of the first aggregation field 521(1).

As mentioned above with respect to FIG. 5, the address 1 field 513 of MAC header 510 may store a receiver address (RA), and the address 2 field 514 of MAC header 510 may store a transmitter address (TA). It is noted that some types of control frames (e.g., CTS frames and ACK frames) may include a single address. Thus, for some implementations, when all of the control frames to be aggregated together in a control aggregate frame 500 and/or control aggregate frame 1100 include a single address, the address 2 field 514 may be set to the same value as the address 1 field 513.

For other implementations, when all of the control frames to be aggregated together in a control aggregate frame 500 and/or control aggregate frame 1100 include a single address, the address 2 field 514 may be omitted, for example, to reduce the size of the corresponding control aggregate frame 500 and/or control aggregate frame 1100. In some aspects, when the address 2 field 514 is omitted from control aggregate frame 500 or control aggregate frame 1100, a signal may be provided in the MAC header 510 to indicate that the address 2 field 514 is omitted. For example, a subtype in the frame control field may be used to indicate that the second address field is to be omitted.

Figure 12:
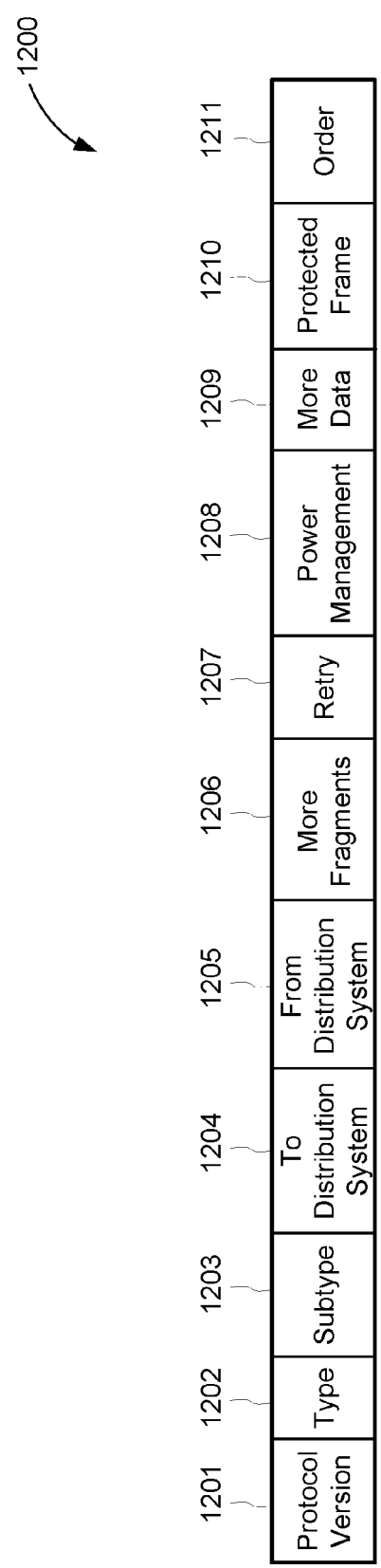
FIG. 12 shows an example frame control field, in accordance with example embodiments.

FIG. 12 shows an example frame control field 1200, in accordance with example embodiments. The frame control field 1200, which may be one embodiment of frame control field 511 of FIGS. 5 and 11, includes a protocol version field 1201, a type field 1202, a subtype field 1203, a "to distribution system" field 1204, a "from distribution system" field 1205, a more fragments field 1206, a retry field 1207, a power management field 1208, a more data field 1209, a protected frame field 1210, and an order field 1211. The fields 1201-1211 are well-known, and therefore not described in detail herein. In some aspects, the subtype field 1203 of frame control field 1200 may be used to indicate that the MAC header 510 of a corresponding control frame to be aggregated within control aggregate frame 500 or control aggregate frame 1100 lacks an address 2 field. In other aspects, a different control extension type may be used to signal that the MAC header 510 of a corresponding control frame to be aggregated within control aggregate frame 500 or control aggregate frame 1100 lacks an address 2 field.

Referring again to FIG. 7, table 700 indicates that the control wrapper frame may not be aggregated into control aggregate frames disclosed herein. The control wrapper (CWAP) frame may be used to encapsulate another control frame that is not itself a control wrapper frame. Each CWAP frame also includes a high throughput (HT) control field that, in accordance with the IEEE 802.11n standards, may allow wrapped control frames to use HT features such as beamforming. For some implementations, a control frame wrapped by a CWAP frame may be aggregated in control aggregate frame 500 and/or in control aggregate frame 1100. In some aspects, the HT control field may be aggregated with the control frame, for example, by including it in the control payload field.

For other implementations, a rule may be employed that undefined or unsupported control frames are not to be included in control aggregate frames 500 and/or in control aggregate frames 1100 for transmission, either broadcast or unicast, to devices that do not such control frames. Use of this rule may allow the extended length 913 of FIG. 9B to be omitted from the aggregation field 910. FIG. 13 shows a table 1300 that indicates whether each of a number of different types of control frames may be aggregated using control aggregate frame 500 and/or control aggregate frame 1100 using this rule, and if so, information to be included in the length field of a corresponding aggregation field.

The example embodiments may allow a control aggregate frame disclosed herein to include an A-MPDU without signaling its presence in the physical layer (PHY) header, which in turn may allow the control aggregate frames disclosed herein to include an A-MPDU and yet be transmitted using an OFDM PHY. In some aspects, an A-MPDU prepender type/subtype may be defined and added before the A-MPDU. In addition, for at least some implementations, the overall FCS field may be omitted, for example, because each aggregated MPDU may include its own FCS field.

Figure 14:
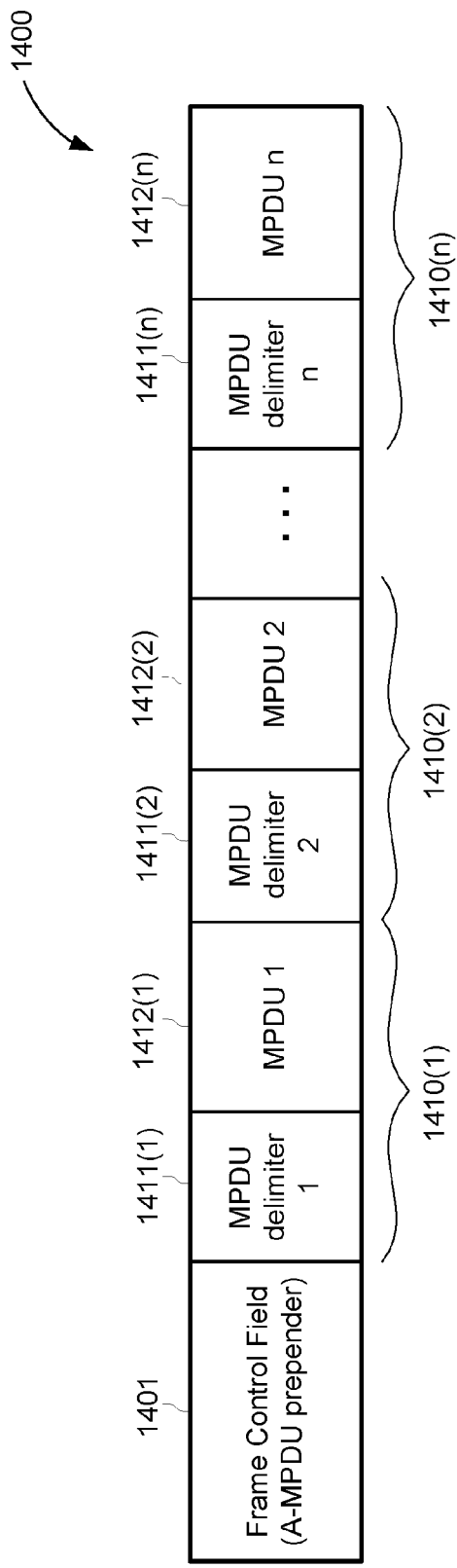
FIG. 14 shows an example packet having an A-MPDU prepender frame control field, in accordance with example embodiments.

FIG. 14 shows an example packet 1400, in accordance with example embodiments. The packet 1400 is shown to include an A-MPDU prepender frame control field 1401 and a number of MPDU delimiter/MPDU pairs 1410(1)-1410(n). The A-MPDU prepender frame control field 1401 may store an A-MPDU prepender. The first MPDU delimiter/MPDU pair 1410(1) includes a first MPDU delimiter 1411(1) and a first MPDU 1412(1), the second MPDU delimiter/MPDU pair 1410(2) includes a second MPDU delimiter 1411(2) and a second MPDU 1412(2), and so on, where the $n^{th}$ MPDU delimiter/MPDU pair 1410(n) includes an $n^{th}$ MPDU delimiter 1411(n) and an $n^{th}$ MPDU 1412(n). In some aspects, use of the A-MPDU prepender frame control field 1401 may eliminate the need to include a full MAC header in packet 1400, for example, because STAs that receive packet 1400 may know that the A-MPDU prepender will be followed by the first MPDU delimiter 1411(1) and the first MPDU 1412(1)—which contains a full MAC header.

Figure 15:
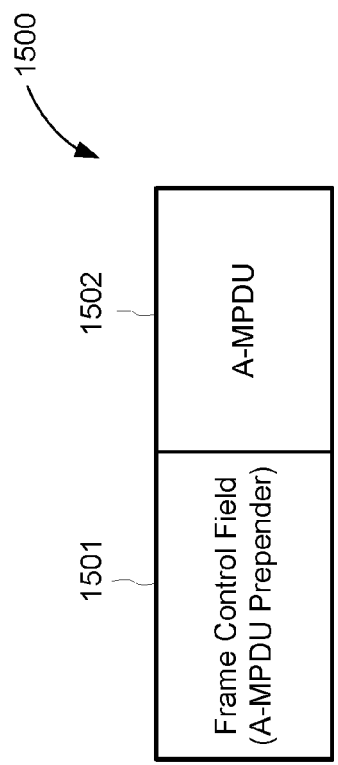
FIG. 15 shows another example packet having an A-MPDU prepender frame control field, in accordance with example embodiments.

FIG. 15 shows another example packet 1500, in accordance with example embodiments. The packet 1500 is shown to include a frame control field 1501 and a frame body 1502. The frame control field 1501 may store an A-MPDU prepender, and the frame body 1502 may store an A-MPDU. In some aspects, legacy STAs that do not recognize the A-MPDU prepender may expect an FCS to be the final 4 octets of packet 1500, and thus the A-MPDU within packet 1502 may appear to legacy STAs as a single MPDU (e.g., rather than as an A-MPDU). Because the FCS fields in the A-MPDU (e.g., in each of the aggregated MPDUs) are not likely to be used for error checking the entire packet 1500, legacy STAs may start an extended interframe space (EIFS) duration after receiving an A-MPDU that includes an A-MPDU prepender.

For some implementations, an A-MPDU that includes an A-MPDU prepender may be included within control aggregate frame 500 and/or control aggregate frame 1100. For example, the A-MPDU prepender may be defined as a control subtype (e.g., using one of the reserved subtypes shown in table 400 of FIG. 4). If the A-MPDU prepender is defined as a control subtype, then an A-MPDU may be included within control aggregate frame 500 and/or control aggregate frame 1100 by setting the control subtype value stored in a corresponding aggregation field 521 to the same value as the A-MPDU prepender, and then embedding the A-MPDU in the corresponding payload field 522.

Figure 16:
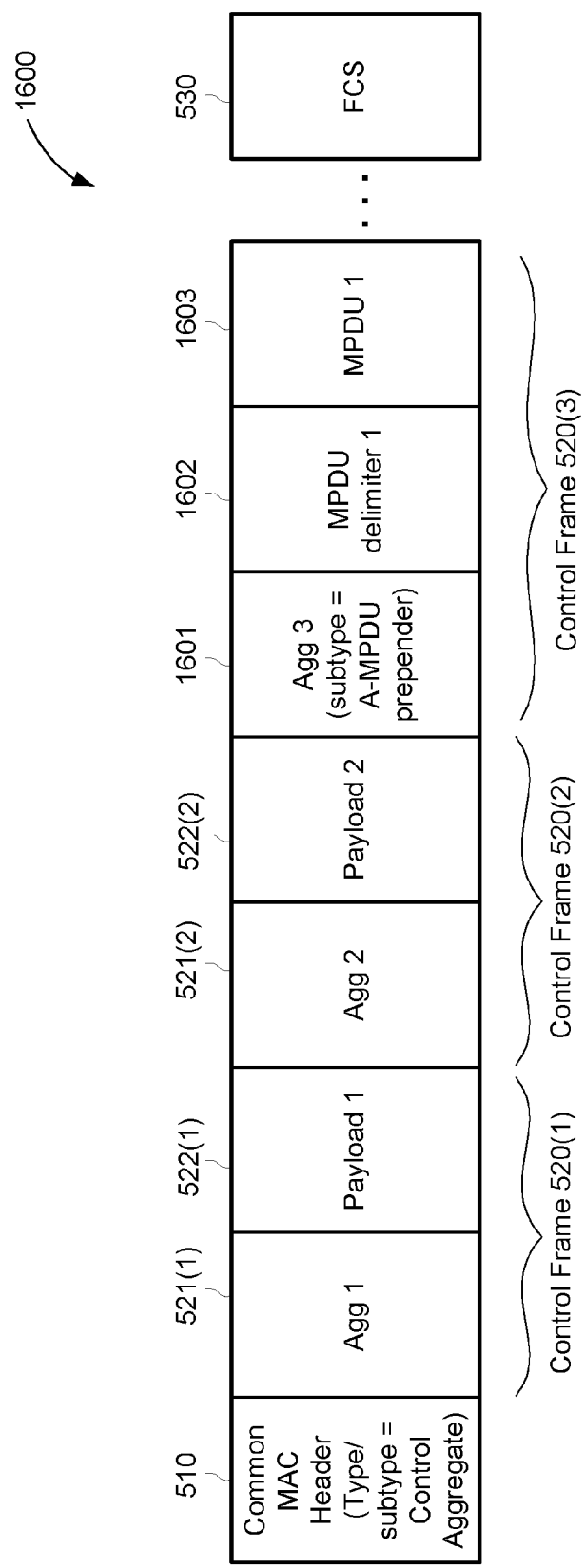
FIG. 16 shows an example control aggregate frame for aggregating one or more A-MPDUs, in accordance with example embodiments.

FIG. 16 shows an example control aggregate frame 1600 in accordance with example embodiments. The control aggregate frame 1600, which is similar to the control aggregate frame 500 of FIG. 5, is formatted to include one or more A-MPDUs. More specifically, for the example of FIG. 16, the third control frame 520(3) to be aggregated within the control aggregate frame 1600 is an A-MPDU, and the control aggregate frame 1600 may include an aggregation field 1601 to store a subtype value indicating an A-MPDU prepender, may include a payload field 1602 to store an MPDU delimiter, and may include a payload field 1603 to store the MPDU. In some aspects, the MPDU included within control aggregate frame 1600 may be encrypted and/or may contain an aggregated MAC service data unit (MSDU). In contrast to the example packet 1400 of FIG. 14, the control aggregate frame 1600 of FIG. 16 may include FCS field 530, for example, because the frame control field of MAC header 510 may indicate a control aggregate frame type.

Figure 17:
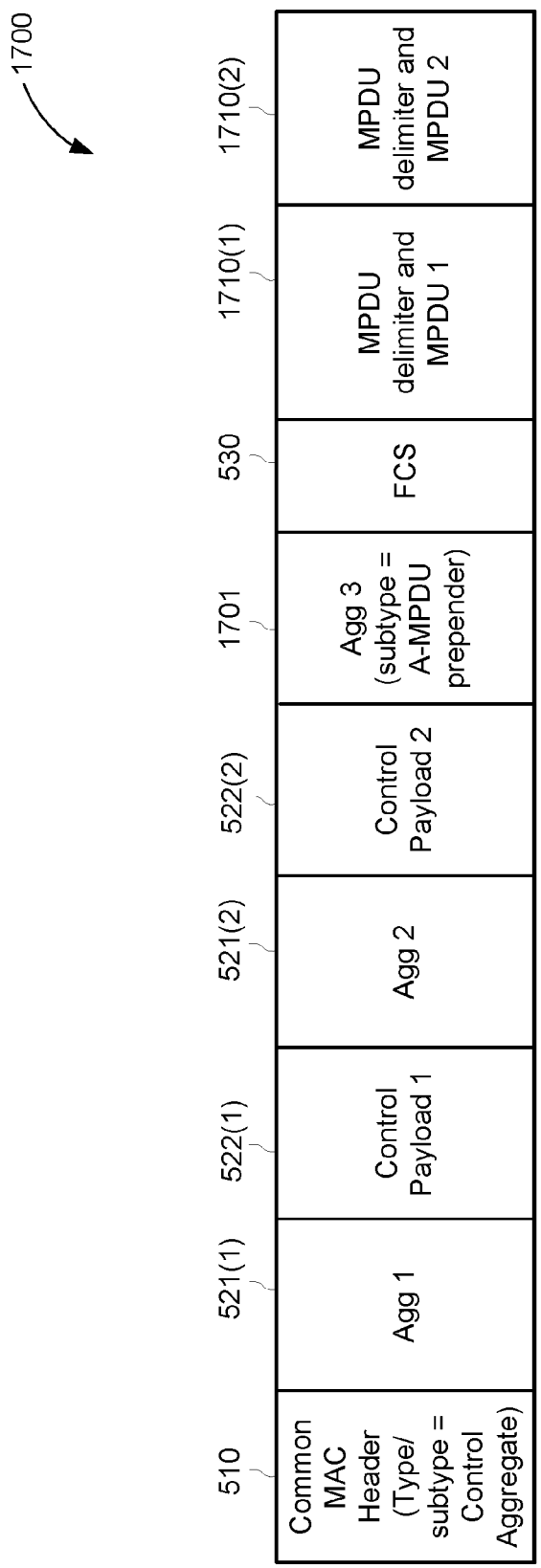
FIG. 17 shows an example control aggregate frame for aggregating two or more A-MPDUs, in accordance with some embodiments.

For other implementations, the FCS field 530 may be inserted after the A-MPDU prepender subtype and before the A-MPDU. For example, FIG. 17 shows another example control aggregate frame 1700 in accordance with example embodiments. The control aggregate frame 1700 is similar to the control aggregate frame 1600 of FIG. 16, except that the FCS field 530 is inserted between an aggregation field 1701 containing the A-MPDU prepender subtype and before a first A-MPDU 1710(1). Note that although the example control aggregate frame 1700 is depicted in FIG. 17 as including only two A-MPDUs 1710(1) and 1710(2), for actual embodiments, the control aggregate frame 1700 may include any suitable number of A-MPDUs.

Figure 18:
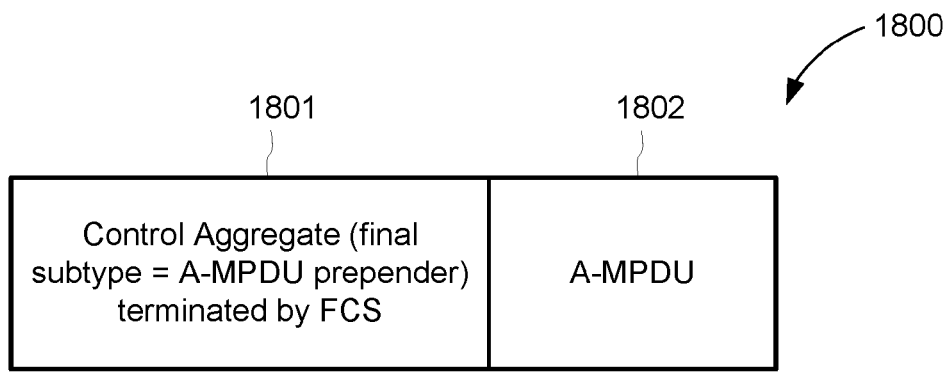
FIG. 18 shows another example control aggregate frame for aggregating an A-MPDU, in accordance with example embodiments.

FIG. 18 shows an example control aggregate frame 1800 that may be a higher-level depiction of the example control aggregate frame 1700 of FIG. 17. The control aggregate frame 1800 includes a control aggregate subtype field 1801 storing a value indicating an A-MPDU prepender, followed by an A-MPDU 1802. In some aspects, the length of a control aggregate frame and its embedded A-MPDU (e.g., as described above with respect to FIGS. 17-18) may be signaled in the PHY header of the corresponding packet. In other aspects, the length may be inferred from the MPDU delimiters, for example, because MPDU delimiters may indicate end of frame (EOF) when no additional data MPDUs are included. The end of the control aggregate frame may be inferred from the occurrence of the A-MPDU prepender subtype in the corresponding aggregation field.

Figure 19:
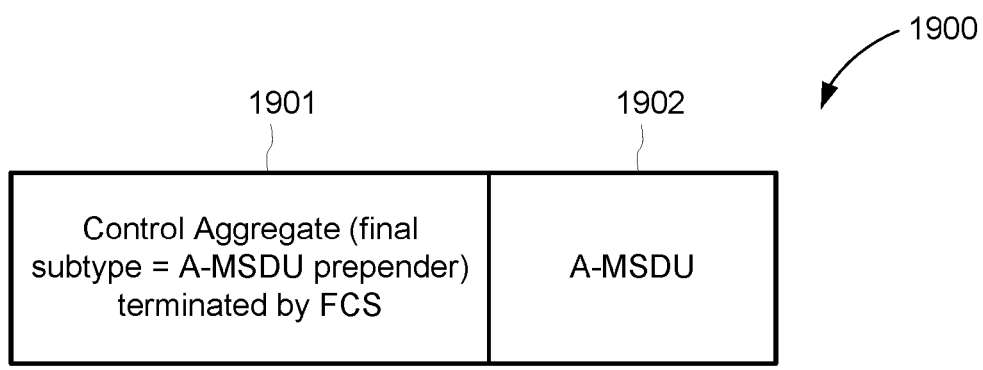
FIG. 19 shows an example control aggregate frame aggregating an A-MSDU, in accordance with example embodiments.

For other implementations, an aggregated MAC service data unit (A-MSDU) may be included in control aggregate frames disclosed herein, for example, by defining an A-MSDU prepender control subtype to indicate the presence of the A-MSDU. For example, FIG. 19 shows another example control aggregate frame 1900, in accordance with example embodiments. The control aggregate frame 1900 may be formatted to include an A-MSDU. The control aggregate frame 1900 is similar to the control aggregate frame 1800 of FIG. 18, except that the final subtype field may indicate an A-MSDU prepender (e.g., rather than an A-MPDU prepender) and may be followed by an MSDU (e.g., rather than an MPDU). Thus, as depicted in FIG. 19, the control aggregate frame 1900 includes a control aggregate field 1901 storing a subtype value indicating an MSDU prepender, and includes an A-MSDU 1902.

Conflicts may arise if multiple control frames are aggregated into a single control aggregate frame and each of the multiple control frames requests a different response. Thus, in some aspects, at most one control frame requiring a response may be aggregated in the same control aggregate frame disclosed herein. In other aspects, when a control aggregate frame includes a number of control frames requesting responses, a response may be provided to only the first (or the last) of the control frames.

FIG. 20 shows an illustrative flow chart depicting an example operation 2000 for communicating a control aggregate frame from a first wireless device to a second wireless device, in accordance with example embodiments. Each of the first and second wireless devices may be any suitable wireless device including, for example, one of the stations STA1-STA4 or AP 110 of FIG. 1 and/or the wireless device 200 of FIG. 2.

The first wireless device may form a control aggregate frame by aggregating a plurality of first control frames into the control aggregate frame (2002). In some aspects, the control aggregate frame may include a single media access control (MAC) header, a plurality of first aggregation fields, and a plurality of first payload fields. Each of the first aggregation fields may store a control frame subtype for a corresponding one of the plurality of first control frames, and each of the first payload fields may store a corresponding one of the plurality of first control frames. The first wireless device may form the control aggregate frame by executing the control frame aggregation software module 242 of FIG. 2. Then, the first wireless device may transmit the control aggregate frame to the second wireless device (2004).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for communicating a control aggregate frame from a first wireless device to a second wireless device, the method performed by the first wireless device and comprising:
   aggregating a plurality of first control frames to be transmitted to the second wireless device, wherein each of the plurality of first control frames is used to assist in delivery of data frames between the first wireless device and the second wireless device;
   generating the control aggregate frame based at least in part on the aggregated plurality of first control frames, the control aggregate frame comprising:
      a single media access control (MAC) header;
      a plurality of first aggregation fields, each storing a control frame subtype for a corresponding one of the plurality of first control frames; and
      a plurality of first payload fields, each storing a corresponding one of the plurality of first control frames; and
   transmitting the control aggregate frame to the second wireless device.

2. The method of claim 1, wherein the control aggregate frame includes only one frame check sequence (FCS) field.

3. The method of claim 1, wherein at least one of the first aggregation fields indicates a length of the corresponding control frame.

4. The method of claim 1, wherein at least one of the plurality of first control frames comprises a null data packet announcement (NDPA) frame.

5. The method of claim 4, wherein a respective one of the plurality of first aggregation fields stores a frame subtype for the NDPA frame, and a respective one of the plurality of first payload fields stores information identifying a number of stations for a sounding operation corresponding to the NDPA frame.

6. The method of claim 1, wherein generating the control aggregate frame further comprises:
   aggregating a number of second control frames to be transmitted to the second wireless device, wherein each of the second control frames does not include a payload; and
   generating the control aggregate frame based on the aggregated plurality of first control frames and the aggregated number of second control frames.

7. The method of claim 6, wherein the control aggregate frame further comprises:
   a plurality of second aggregation fields, each storing a control frame subtype for a corresponding one of the number of second control frames.

8. The method of claim 6, wherein each of the number of second control frames is one member of the group consisting of an acknowledgement (ACK) frame, a block acknowledgement (BA) frame, a block acknowledgement request (BAR) frame, a beamforming report poll (BRPOL) frame, a clear-to-send (CTS) frame, a ready-to-send (RTS) frame, a power-save poll (PS-Poll) frame, and a null data frame.

9. The method of claim 1, wherein the control aggregate frame further comprises:
   at least one aggregated MAC service data unit (A-MSDU) prepender; and
   at least one A-MSDU following the A-MSDU prepender.

10. The method of claim 1, wherein the control aggregate frame further comprises:
   at least one aggregated MAC protocol data unit (A-MPDU) prepender; and
   at least one A-MPDU delimiter/A-MPDU pair following the A-MPDU prepender.

11. A wireless device, comprising:
one or more processors; and
a memory storing one or more programs comprising instructions that, when executed by the one or more processors, cause the wireless device to:
aggregate a plurality of first control frames to be transmitted to another wireless device, wherein each of the plurality of first control frames is used to assist in delivery of data frames between the wireless device and the other wireless device;
generate a control aggregate frame based at least in part on the aggregated plurality of first control frames, the control aggregate frame comprising:
a single media access control (MAC) header;
a plurality of first aggregation fields, each storing a control frame subtype for a corresponding one of the plurality of first control frames; and
a plurality of first payload fields, each storing a corresponding one of the plurality of first control frames; and
transmit the control aggregate frame to the other wireless device.

12. The wireless device of claim 11, wherein the control aggregate frame includes only one frame check sequence (FCS) field.

13. The wireless device of claim 11, wherein at least one of the first aggregation fields indicates a length of the corresponding control frame.

14. The wireless device of claim 11, wherein at least one of the plurality of first control frames comprises a null data packet announcement (NDPA) frame.

15. The wireless device of claim 14, wherein a respective one of the plurality of first aggregation fields stores a frame subtype for the NDPA frame, and a respective one of the plurality of first payload fields stores information identifying a number of stations for a sounding operation corresponding to the NDPA frame.

16. The wireless device of claim 11, wherein execution of the instructions to generate the control aggregate frame further causes the wireless device to:
aggregate a number of second control frames to be transmitted to the other wireless device, wherein each of the second control frames does not include a payload; and
generate the control aggregate frame based on the aggregated plurality of first control frames and the aggregated number of second control frames.

17. The wireless device of claim 16, wherein the control aggregate frame further comprises a plurality of second aggregation fields, each storing a control frame subtype for a corresponding one of the number of second control frames.

18. The wireless device of claim 16, wherein each of the number of second control frames is one member of the group consisting of an acknowledgment (ACK) frame, a block acknowledgment (BA) frame, a block acknowledgment request (BAR) frame, a beamforming report poll (BRPOL) frame, a clear-to-send (CTS) frame, a ready-to-send (RTS) frame, a power-save poll (PS-Poll) frame, and a null data frame.

19. The wireless device of claim 11, wherein the control aggregate frame further comprises:
at least one aggregated MAC service data unit (A-MSDU) prepender; and
at least one A-MSDU following the A-MSDU prepender.

20. The wireless device of claim 11, wherein the control aggregate frame further comprises:
at least one aggregated MAC protocol data unit (A-MPDU) prepender; and
at least one A-MPDU delimiter/A-MPDU pair following the A-MPDU prepender.

21. A non-transitory computer-readable storage medium storing one or more programs containing instructions that, when executed by one or more processors of a first wireless device, cause the first wireless device to perform operations comprising:
aggregating a plurality of first control frames to be transmitted to a second wireless device, wherein each of the plurality of first control frames is used to assist in delivery of data frames between the first wireless device and the second wireless device;
generating a control aggregate frame based at least in part on the aggregated plurality of first control frames, the control aggregate frame comprising:
a single media access control (MAC) header;
a plurality of first aggregation fields, each storing a control frame subtype for a corresponding one of the plurality of first control fields; and
a plurality of first payload fields, each storing a corresponding one of the plurality of first control frames; and
transmitting the control aggregate frame to the second wireless device.

22. The non-transitory computer-readable storage medium of claim 21, wherein the control aggregate frame includes only one frame check sequence (FCS) field.

23. The non-transitory computer-readable storage medium of claim 21, wherein at least one of the first aggregation fields indicates a length of the corresponding control frame.

24. The non-transitory computer-readable storage medium of claim 21, wherein at least one of the plurality of first control frames comprises a null data packet (NDPA) frame.

25. The non-transitory computer-readable storage medium of claim 24, wherein a respective one of the plurality of first aggregation fields stores a frame subtype for the NDPA frame, and a respective one of the plurality of first payload fields stores information identifying a number of stations for a sounding operation corresponding to the NDPA frame.

26. The non-transitory computer-readable storage medium of claim 21, wherein execution of the instructions for generating the control aggregate frame causes the first wireless device to perform operations further comprising:
aggregating a number of second control frames to be transmitted to the second wireless device, wherein each of the second control frames does not include a payload; and
generating the control aggregate frame based on the aggregated plurality of first control frames and the aggregated number of second control frames.

27. The non-transitory computer-readable storage medium of claim 26, wherein the control aggregate frame further comprises:
a plurality of second aggregation fields, each storing a control frame subtype for a corresponding one of the number of second control frames.

28. The non-transitory computer-readable storage medium of claim 26, wherein each of the number of second control frames is one member of the group consisting of an acknowledgment (ACK) frame, a block acknowledgment (BA) frame, a block acknowledgment request (BAR) frame, a beamforming report poll (BRPOL) frame, a clear-to-send (CTS) frame, a ready-to-send (RTS) frame, a power-save poll (PS-Poll) frame, and a null data frame.

29. The non-transitory computer-readable storage medium of claim 21, wherein the control aggregate frame further comprises:
   at least one aggregated MAC service data unit (A-MSDU) prepender; and
   at least one A-MSDU following the A-MSDU prepender.

30. The non-transitory computer-readable storage medium of claim 21, wherein the control aggregate frame further comprises:
   at least one aggregated MAC protocol data unit (A-MPDU) prepender; and
   at least one A-MPDU delimiter/A-MPDU pair following the A-MPDU prepender.

31. A first wireless device for communicating a control aggregate frame to a second wireless device, the first wireless device comprising:
   means for aggregating a plurality of first control frames to be transmitted to the second wireless device, wherein each of the plurality of first control frames is used to assist in delivery of data frames between the first wireless device and the second wireless device;
   means for generating the control aggregate frame based at least in part on the aggregated plurality of first control frames, the control aggregate frame comprising:
   a single media access control (MAC) header;
   a plurality of first aggregation fields, each storing a control frame subtype for a corresponding one of the plurality of first control frames; and
   a plurality of first payload fields, each storing a corresponding one of the plurality of first control frames; and
   means for transmitting the control aggregate frame to the second wireless device.

32. The first wireless device of claim 31, wherein the control aggregate frame includes only one frame check sequence (FCS) field.

33. The first wireless device of claim 31, wherein at least one of the first aggregation fields indicates a length of the corresponding control frame.

34. The first wireless device of claim 31, wherein at least one of the plurality of first control frames comprises a null data packet announcement (NDPA) frame.

35. The first wireless device of claim 34, wherein a respective one of the plurality of first aggregation fields stores a frame subtype for the NDPA frame, and a corresponding one of the plurality of first payload fields stores information identifying a number of stations for a sounding operation corresponding to the NDPA frame.

36. The first wireless device of claim 31, wherein the means for generating the control aggregate frame is to further:
   aggregate a number of second control frames to be transmitted to the second wireless device, wherein each of the second control frames does not include a payload; and
   generating the control aggregate frame based on the aggregated plurality of first control frames and the aggregated number of second control frames.

37. The first wireless device of claim 36, wherein the control aggregate frame further comprises a plurality of second aggregation fields, each storing a control frame subtype for a corresponding one of the number of second control frames.

38. The first wireless device of claim 36, wherein each of the number of second control frames is one member from the group consisting of an acknowledgment (ACK) frame, a block acknowledgment (BA) frame, a block acknowledgment request (BAR) frame, a beamforming report poll (BRPOL) frame, a clear-to-send (CTS) frame, a ready-to-send (RTS) frame, a power-save poll (PS-Poll) frame, and a null data frame.

39. The first wireless device of claim 31, wherein the control aggregate frame further comprises:
   at least one aggregated MAC service data unit (A-MSDU) prepender; and
   at least one A-MSDU following the A-MSDU prepender.

40. The first wireless device of claim 31, wherein the control aggregate frame further comprises:
   at least one aggregated MAC protocol data unit (A-MPDU) prepender; and
   at least one A-MPDU delimiter/A-MPDU pair following the A-MPDU prepender.

\* \* \* \* \*